2 Sheets—Sheet 1.

C. H. HAYDEN.
FIRE-KINDLER.

No. 189,310. Patented April 10, 1877.

Witnesses.
James Martin Jr.
D. P. Howe

Inventor:
Charles H. Hayden
by
Mason, Fenwick & Lawrence
attys.

N. PETERS, PHOTO-LITHOGRAPHER, WASHINGTON, D. C.

2 Sheets—Sheet 2.

C. H. HAYDEN.
FIRE-KINDLER.

No. 189,310. Patented April 10, 1877.

Witnesses.
James Martin Jr.
D P Howe

Inventor.
Charles H. Hayden
by
Mason, Fenwick & Lawrence
attys.

UNITED STATES PATENT OFFICE.

CHARLES H. HAYDEN, OF COLUMBUS, OHIO.

IMPROVEMENT IN FIRE-KINDLERS.

Specification forming part of Letters Patent No. 189,310, dated April 10, 1877; application filed February 23, 1877.

*To all whom it may concern:*

Be it known that I, CHARLES H. HAYDEN, of Columbus, in the county of Franklin and State of Ohio, have invented a new and useful Improvement in Manufactured Fire-Kindlers; and I do hereby declare that the following is a full, clear, and exact description thereof, reference being had to the accompanying drawings, forming part of this specification, in which—

Figure 1:
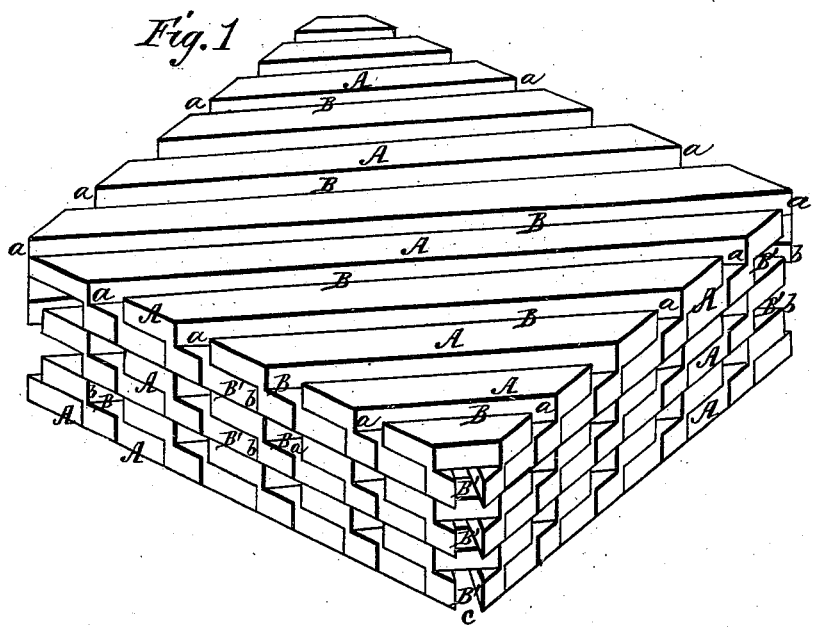
Figure 2:
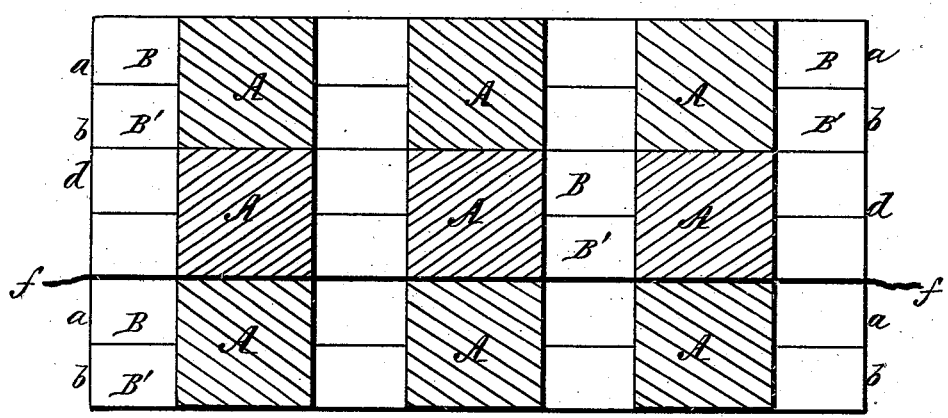
Figure 3:
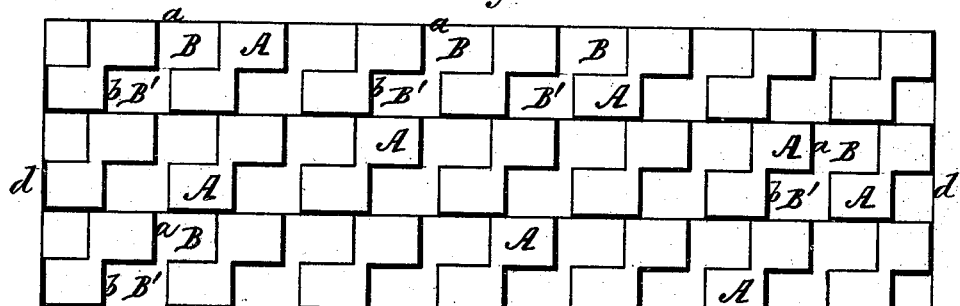
Figure 4:
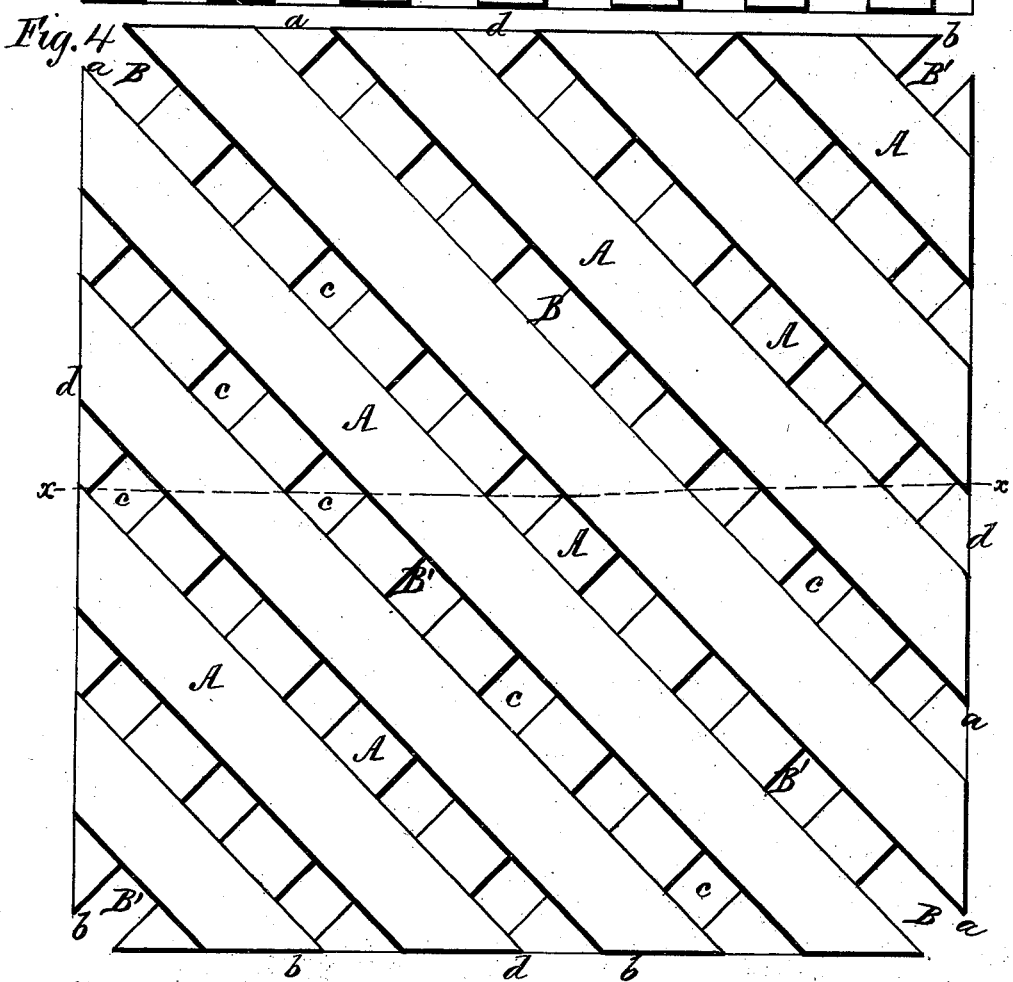

Figure 1 is a perspective view of my fire-kindler. Fig. 2 is a vertical central section of the same in the line $x\ x$ of Fig. 4. Fig. 3 is a side elevation, and Fig. 4 a top view, of the same.

The object of my invention is to reduce the cost for material and labor required in the manufacture of that description of fire-kindler which has air-channels leading down through and across and out at all sides of it. Another object is to render practicable the making of such kindlers of sizes adapted for large fire-boxes and furnaces, as well as for small stoves, without using such expensive lumber as heretofore required, and without expending an unwarranted amount of labor on an article of this description, which, if used by the public, must be furnished at the smallest possible cost to the consumer.

The nature of my invention consists in a kindling-pile formed of two or more channeled boards, united together and daubed with a composition of rosin and oil, or other suitable inflammable substance, each of the respective boards of the pile being provided with transverse air-channels, cut in its bottom and top from side to side and across the grain of the wood, and with vertical passages down through it, and the said kindling-pile having its boards so arranged that the vertical passages of them all communicate with the transverse air-channels, and the said kindling-pile being, when desirable, rendered more readily ignitible by affixing shavings, paper, or other quickly-combustible material to their surfaces, or by placing such substances between them, the said substances being applied when the daubing-composition is in a fluid state.

In carrying out my invention, I take planks or boards of a proper width, and of about one or one and one-half inch in thickness, and cut the same in pieces of suitable lengths, and in the top and bottom of each piece A of this board or plank stuff I cut air-circulation channels or grooves B B', of a considerable width. The grooves B run diagonally across the piece A, and should extend from side to side, as shown at *a a*. The grooves B' also run diagonally across the said piece, and extend from side to side, as shown at *b b*; or, the two sets of grooves B and B' might be cut parallel with the sides of the board and at right angles to one another. The depth of the grooves is great enough to have those on one side intersect those on the other side. By having the grooves intersect one another, vertical air-passages *c* are formed in the pieces of board.

For sawing the grooves in the board a "wabble" saw is used, and the cut is made across the grain of the wood, instead of into or longitudinal with the grain of the wood, as in cases where kindling "blocks" having grooves or channels similar to the ones shown by me have been produced out of a single piece of scantling or studding-lumber.

The pieces of plank-board grooved as just described are daubed with rosin and oil, so as to make them inflammable, and upon the coated surface paper, coarse sawdust, or shavings are placed so as to adhere when the composition becomes dry and hard. To form a pile, two, three, four, or more of the prepared pieces A are placed together one on top of another, as shown in Fig. 2, and united by the rosin and oil composition at the points *d d*.

The paper or other igniting substance may be applied so as to come between two of the pieces A A, as shown at *f*, Fig. 2, or it may be on the top and bottom or on the ends or sides.

From an inspection of the drawings it will be readily seen that a very large number of air-channels for the circulation of air for the promotion of combustion are afforded between each pair of the pieces A A, and also from top to bottom of the pile, and that these passages all communicate and extend throughout the pile to all sides thereof.

In some cases a pile of a more costly character, but having all the passages shown and described, might be produced by piling up strips of half the thickness of the plank or board pieces, but in such construction top strips for forming the top channels of a piece, A, would have to be united to the bottom strips which form the bottom grooves or channels of such piece, and these sections thus formed of strips would be piled upon one another. I prefer, however, to use the single pieces A with grooves in their top and bottom, as represented, as the expense of manufacturing the pile is much less.

The great advantage of my invention will be apparent when it is considered that a block equal in thickness to three of the pieces A would be very difficult to saw, since the grooves would have to be cut to a correspondingly-great depth, and, being made out of scantling, the labor would be increased, as sawing must necessarily be done in the line of the grain of the wood, and to use scantling for pieces of that size would entail an unwarranted expense, since material worth from fourteen to twenty dollars per thousand would have to be used, whereas, if boards or planks are used, the sawing is done across the grain, and the cost per thousand for the material would be from seven to nine dollars only, and the depth of grooves can be very shallow for each section of the pile.

What I claim as my invention is—

1. The kindling-pile formed of two or more pieces of plank or board, grooved on top and bottom transversely to the grain of the wood, and placed on one another and secured together in the manner described, so as to form communicating circulation-passages, which extend from side to side on all sides and up through the pile, substantially as described.

2. A pile for kindling constructed of pieces which are grooved, in the manner described, and afterward united together, and when united form vertical and lateral circulation-passages, which passages are in communication with one another and extend out to all sides of the pile, as herein described.

Witness my hand in the matter of my application for a patent for an improved fire-kindler this 19th day of February, A. D. 1877.

CHARLES H. HAYDEN.

Witnesses:
JAMES MARTIN, Jr.,
A. G. HEYLMUN.